United States Patent [19]

McMillan, Jr. et al.

[11] Patent Number: 5,224,062
[45] Date of Patent: Jun. 29, 1993

[54] METHOD AND APPARATUS FOR FAST IMPLEMENTATION OF INVERSE DISCRETE COSINE TRANSFORM IN A DIGITAL IMAGE PROCESSING SYSTEM USING OPTIMIZED LOOKUP TABLES

[75] Inventors: Leonard McMillan, Jr., Apex; Lee A. Westover, Chapel Hill, both of N.C.

[73] Assignee: Sun Microsystems, Inc., Mountain View, Calif.

[21] Appl. No.: 852,970

[22] Filed: Mar. 17, 1992

[51] Int. Cl.⁵ .............................................. G06F 7/38
[52] U.S. Cl. ................................................... 364/725
[58] Field of Search ........................ 364/725, 726, 727

[56] References Cited

U.S. PATENT DOCUMENTS

| | | | |
|---|---|---|---|
| 4,288,858 | 9/1981 | Merola et al. | 364/725 |
| 4,679,163 | 7/1987 | Arnould et al. | 364/725 |
| 4,829,465 | 5/1989 | Knauer et al. | 364/725 |
| 4,841,464 | 6/1989 | Guichard et al. | 364/725 |
| 5,053,985 | 10/1991 | Friedlander et al. | 364/725 |

*Primary Examiner*—Jerry Smith
*Assistant Examiner*—Chuong D. Ngo
*Attorney, Agent, or Firm*—Blakely, Sokoloff, Taylor & Zafman

[57] ABSTRACT

In a digital image processing system, a CPU and a memory is provided to an image signal processing subsystem for computing the output vector of an inverse discrete cosine transform. The inverse discrete cosine transform is represented as a linear system and the output vector is computed using a forward mapping procedure where system matrix columns scaled by the non-zero quantized corresponding transform domain coefficient selected from the input vector are successively accumulated into the output vector. Dequantizations and scalings are performed as a combined single step by looking up the kernel values of the scaled reconstruction kernels from lookup tables corresponding to the selected transform domain coefficients' positions in the input vector. The lookup tables are highly optimized exploiting the symmetry characteristics of the reconstruction kernels, the inherent properties of quantization and the statistical attributes of the quantized transform domain coefficients. Furthermore, the calculations of the table values are also optimized. As a result, significant improvement in IDCT efficiency is achieved for the digital image processing system.

18 Claims, 4 Drawing Sheets

METHOD AND APPARATUS FOR FAST IMPLEMENTATION OF INVERSE DISCRETE COSINE TRANSFORM IN A DIGITAL IMAGE PROCESSING SYSTEM USING OPTIMIZED LOOKUP TABLES

BACKGROUND OF THE INVENTION

1. Field of the Invention

The present invention relates to the field of digital image processing systems, in particular, unitary transforms performed on these systems. More specifically, the present invention relates to fast implementation of the inverse discrete cosine transform.

2. Related Application

The present application is related to U.S. patent applications, Ser. No. 07/852,969, filed on Mar. 17, 1992, entitled *Method and Apparatus for Very Fast Implementation of Inverse Discrete Cosine Transform on a Digital Image Processing System Using Low Cost Accumulators*, assigned to the assignee of the present invention, Sun Microsystems, Inc. of Mountain View, Calif.

3. Background

In image processing, an image is typically represented as a continuous mathematical function. The continuous representation is either made deterministically or statistically. In a deterministic representation, the point properties of the image are considered, whereas, in a statistical representation, the average properties of the image are specified.

In a digital image processing system, typically the continuous representation, whether deterministic or statistic, is constructed by spatial sampling of the physical image's intensity, photographic density, or other like measurements. The analog results of spatial sampling in turn are quantized into discrete results that are proportional to the amplitude of the digital system. The image is reconstructed by "inverting" the quantized discrete spatial sampling results.

Additionally, various unitary transforms may be performed before the image is reconstructed by inversion. The transforms are performed to extract features such as brightness from images, reducing bandwidth or reducing dimensionality. Since a sequence of images literally goes through tens of thousands of transforms, the speed in which these transforms can be performed is of critical importance. For example, if a sequence of images is to be displayed at 10 frames per second, each image has a frame size of 320×224 pixels divided into 280 macroblocks of 16×16 pixels, and each macroblock has 4 (8×8) luminance values and 2 (8×8) chrominance values, 16,800 inverse transforms (280×(4+2)×10) per second will have to be performed on the transformed image data.

The discrete cosine transform has found widespread application because of its ability to decorrelate highly correlated inputs and the discoveries of efficient implementation techniques. The earliest fast implementation techniques for discrete cosine transform were based on approaches originally developed for fast Fourier transform, in which the periodicity and recursive nature of the underlying basis functions were exploited. Later fast were developed by considering various factorizations of the discrete cosine transform's basis matrix.

The structural similarities of inverse discrete cosine transform to discrete cosine transform has enabled each of the fast implementation techniques for cosine discrete transform to be easily adapted to their dual inverse discrete cosine transform. As a consequence, there has been little concentration on specific formulations of the inverse discrete cosine transform, and the unique statistical properties of the transform domain description of the input sequence has largely been ignored.

Thus it is desirable to develop fast implementation techniques for inverse discrete cosine transform exploiting the unique statisical properties of the input sequence. As will be disclosed, the present invention provides a method and an apparatus to perform inverse discrete cosine transform in image processing that do just that.

For further description of image processing, see William K. Pratt, *Digital Image Processing*, Wiley Interscience, 1978. For further descriptions of fast implementation techniques for discrete cosine transform, see K. R. Rao and P. Yip, *Discrete Cosine Transforms: Algorithms, Advantages, Applications*, Academic Press, 1990.

SUMMARY OF THE INVENTION

A method and apparatus for fast implementation of inverse discrete cosine transform (IDCT) on a digital image processing system is disclosed. An inverse discrete cosine transform can be described as the multiplication of an input vector by a constant-coefficient linear system matrix to produce an output vector. The input vector is typically sparse, meaning that it is composed primarily of zero-valued transform domain coefficients. The transform domain coefficients are typically quantized, requiring their dequantization before they can be used for calculations. Each system-matrix column vector corresponding to a specific position of the input vector is called a reconstruction kernel.

Under the presently preferred embodiment, a central processing unit (CPU) coupled to a memory is provided to the image signal processing subsystem of the digital image processing system to compute the output vector. The CPU calculates the matrix product and the output vector by successive accumulation of each system-matrix column vector scaled by the corresponding non-zero dequantized transform domain coefficient. This procedure is called forward-mapping. More specifically, the CPU initially fills the output vector with zero values. Then the CPU selects a quantized transform domain coefficient from the input vector. If the quantized transform domain coefficient is non-zero, the CPU dequantizes the transform domain coefficient and scales its corresponding system-matrix column vector. These two steps are combined into a single step by looking up the kernel values of the reconstruction kernel from a lookup table stored in memory of the image signal processing subsystem corresponding to the selected transform domain coefficient's position in the input vector. Upon completion of the combined dequantization and scaling step, the CPU accumulates the scaled system-matrix column vector into the output vector. The CPU repeats the process for each non-zero quantized transform domain coefficient in the input vector.

Each of the lookup tables stored in the memory of the image signal processing system comprises a plurality of potential input values and the kernel values of their corresponding scaled reconstruction kernels. In their presently preferred form, the corresponding lookup tables are highly optimized, exploiting the symmetry characteristics of the reconstruction kernels, the inherent properties of quantization, and the statistical attributes of the quantized transform domain coefficients, thereby reducing the total amount of computations required to inverse transform an image and improving the overall IDCT efficiency of the digital image processing system.

The optimizations include:

a) Storing at most $(N^2+2N)/8$ unique kernel values of the reconstruction kernel for each potential input value of an $N \times N$ IDCT in each lookup table, instead of storing all $N^2$ kernel values. For each selected transform domain coefficient, the CPU retrieves the at most $(N^2+2N)/8$ unique kernel values and generates all $N^2$ kernel values of the scaled reconstruction kernel using the retrieved at most $(N^2+2N)/8$ unique kernel values.

b) Storing the at most $(N^2+2N)/8$ unique kernel values of the scaled reconstruction kernel for quantized potential input values in each table, instead of storing the at most $(N^2+2N)/8$ unique kernel values for the more numerous dequantized potential input values.

c) Storing the at most $(N^2+2N)/8$ unique kernel values of the scaled reconstruction kernel for only a subset of the quantized potential input values in each lookup table at any particular point in time, and indexing the table locations of each set of potential input value and the at most $(N^2+2N)/8$ unique kernel values for its scaled reconstruction kernel by the least significant bits of the quantized transform domain coefficients.

Additionally, the table values of the lookup tables stored in the memory of the image signal processing subsystem are not precalculated. The at most $(N^2+2N)/8$ unique kernel values of the scaled reconstruction kernel for a quantized potential input value are computed and stored into the lookup table in conjunction with the quantized potential input value only if the at most $(N^2+2N)/8$ unique kernel values are needed for a selected quantized transform domain coefficient and they are not stored in the indexed table locations of the corresponding lookup table. However, once they are calculated and stored, they are available for reuse by subsequent IDCTs until they are overwritten.

BRIEF DESCRIPTION OF THE DRAWINGS

The objects, features, and advantages of the present invention will be apparent from the following detailed description of the preferred embodiment of the invention with references to the drawings in which.

NOTATIONS AND NOMENCLATURE

The detailed description which follows is presented largely in terms of program procedures executed on a network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general pupose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION PRESENTLY PREFERRED AND ALTERNATE EMBODIMENTS

A method and apparatus for fast implementation of inverse discrete cosine transform on a digital image processing system is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
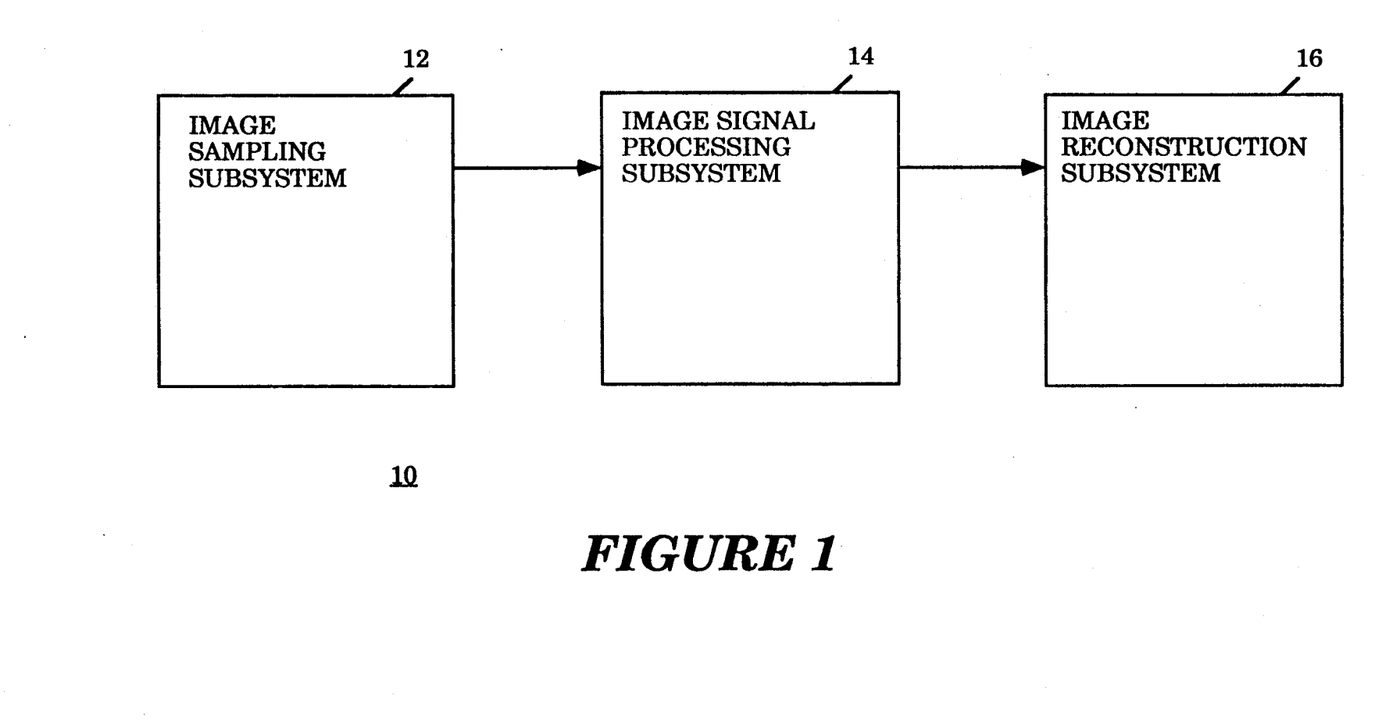
FIG. 1 shows a logical view of an image processing system that incorporates the teachings of the present invention.

Referring now to FIG. 1, a block diagram illustrating a digital image processing system that incorporates the teachings of the present invention is shown. Shown is an image sampling subsystem 12 that outputs to a digital image signal processing subsystem 14. The image sampling subsystem 12 is used for sampling physical images to generate analog spatial samples for the images. The image sampling subsystem 12 is intended to represent a broad category of image sampling devices which are well known in the art and will not be described further.

The image signal processing subsystem 14 takes the outputs of the image sampling subsystem 12 as inputs and in turn outputs to the image reconstruction subsystem 16. The image signal processing subsystem 14 performs quantization to convert the analog samples into discrete samples, unitary transforms including discrete cosine transform, dequantization, and inverse unitary transforms including inverse discrete cosine transform. The image signal processing subsystem 14 will be described in further detail later with references to FIG. 2.

The image reconstruction subsystem 16 takes the outputs of the image signal processing subsystem 14 as inputs, and in turn outputs the images. The image reconstruction subsystem 16 is also intended to represent a broad category of image reconstructors, including raster displays, which are also well known in the art and will not be described further.

Figure 2:
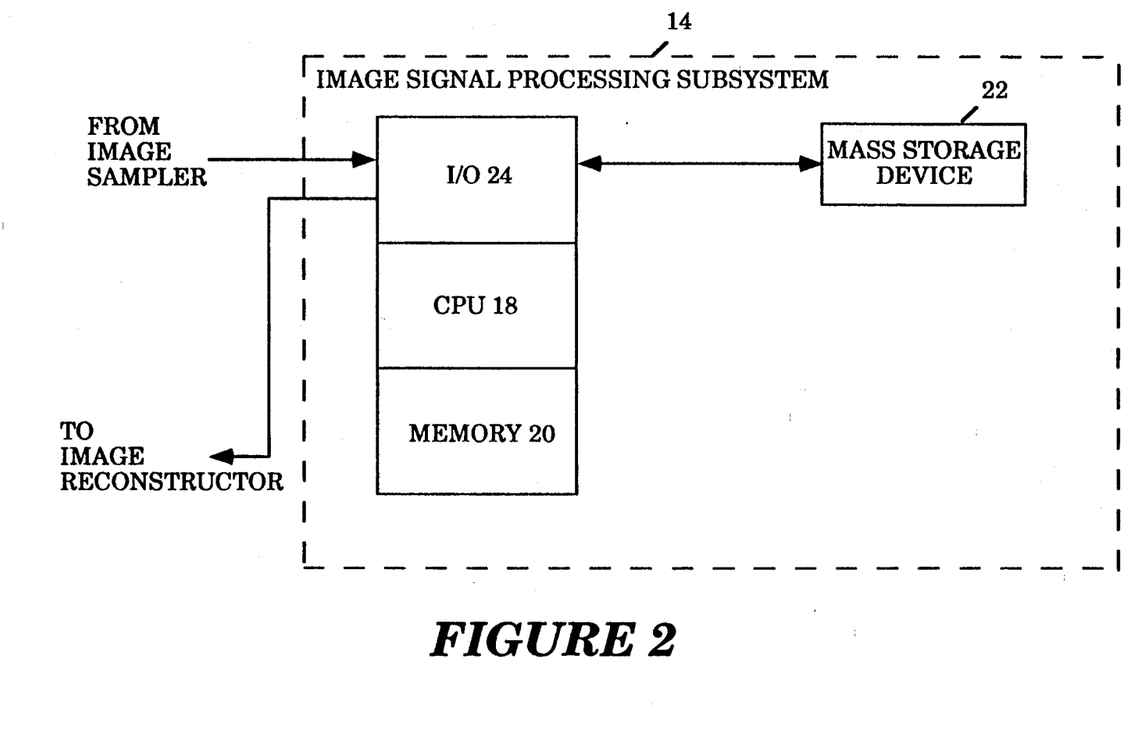
FIG. 2 shows a logical view of the image signal processing subsystem of the image processing system illustrated in FIG. 1.

Referring now to FIG. 2, a block diagram illustrating the image signal processing subsystem illustrated in FIG. 1 is shown. Shown is an input/output (I/O) circuit 24 coupled to a central processing unit (CPU) 18 and a mass storage device 22. The I/O circuit 24 is used to communicate information in appropriately structure form to and from the image sampler, the image reconstructor and the mass storage device 22. The I/O circuit 24 is intended to represent a broad category of I/O circuits which are well known in the art and will not be described further.

The mass storage device 22 is used for storing the analog samples, and the quantized discrete samples. The mass storage device 22 is also intended to represent a broad category of mass storage devices which are well known in the art and will not be described further.

The CPU 18, in addition to being coupled to the I/O circuit 16, is also coupled to a memory 20. The CPU 18 is used to perform the quantization, transforms including discrete cosine transform, dequantization and inverse unitary transforms including inverse discrete cosine transform. Except for the manner in which the CPU 18 is used to perform the inverse discrete cosine transform, the CPU 18 is also intended to represent a broad category of processors which are well known in the art and will not be described further.

For a type II, N×N, two dimensional inverse discrete cosine transform:

$$O(x,y) = \sum_{v=0}^{N-1} \sum_{u=0}^{N-1} f(u)f(v)i(u,v) \times \cos\left(\frac{\pi(2x+1)u}{2N}\right)\cos\left(\frac{\pi(2y+1)v}{2N}\right) \quad (1)$$

where: $x, y: \rightarrow [0, N-1]$ and $$f(i) = \begin{cases} \frac{\sqrt{2}}{2} & \text{for } i = 0; \\ 1 & \text{otherwise} \end{cases}$$

The CPU 18 implements the inverse discrete cosine transform as a linear system:

$$O = CI, \quad (2)$$

where I and O are $N^2$-dimensional vectors constructed from the row-ordered enumeration of the N×N transformation input sequence, $i(u,v)$, and the reconstructed output sequence, $o(x,y)$, respectively. The system matrix C, is composed of the input weighting terms and is defined as follows:

$$c(yN + x, vN + u) = f(u)f(v) \times \cos\left(\frac{\pi(2x+1)u}{2N}\right)\cos\left(\frac{\pi(2y+1)v}{2N}\right)$$

Typically, the input vector is sparse, meaning that it is composed primarily of zero valued transform domain coefficients. The transform domain coefficients are typically quantized, requiring their dequantization before they can be used for calculations. Each system-matrix column corresponding to a specific position of the input vector is called a reconstruction kernel.

The CPU 18 computes the output vector O using a forward mapping procedure, that is, each system-matrix column is scaled by the corresponding dequantized input value and successively accumulated into the output vector O. For example, dequantized $i_{uv}$ scales each element in the $(vN+u)^{th}$ column, $C^{uv}$, of the system matrix and the result is accumulated into the output vector O.

where $$O = \sum_{uv} i_{uv} C^{uv}$$

$$C^{uv} = \begin{bmatrix} C_0^{uv} \\ C_1^{uv} \\ \cdot \\ \cdot \\ \cdot \\ C_M^{uv} \end{bmatrix}$$

with $$C_k^{uv} = f(u)f(v) \times \cos\left(\frac{\pi(2x_k+1)u}{2N}\right)\cos\left(\frac{\pi(2y_k+1)v}{2N}\right)$$

$$y_k = \frac{k}{N} \text{ and } x_k = k \bmod N$$

As a matrix equation, this is written as:

$$\begin{bmatrix} O_{00} \\ O_{01} \\ \cdot \\ \cdot \\ O_{LL} \end{bmatrix} = i_{00} \begin{bmatrix} C^{00} \\ C_1^{01} \\ \cdot \\ \cdot \\ C_M^{00} \end{bmatrix} + i_{01} \begin{bmatrix} C_0^{01} \\ C_1^{01} \\ \cdot \\ \cdot \\ C_M^{01} \end{bmatrix} + \ldots + i_{LL} \begin{bmatrix} C_0^{LL} \\ C_1^{LL} \\ \cdot \\ \cdot \\ C_M^{LL} \end{bmatrix}$$

where L, M: $\rightarrow [0, N-1]$, and each column matrix is referred as a reconstruction kernel.

How the CPU 18 computes the output vector O using a forward mapping procedure will be described in further detail later with references to FIG. 4.

Still referring to FIG. 2, the memory 20 is used to store the working data and the intermediate results of the quantization, unitary transforms including discrete cosine transforms, dequantization and inverse unitary transforms including inverse discrete cosine transforms, performed by the CPU 18. In particular, the memory 20 is used to store a plurality of lookup tables of the present invention for the CPU 18 to perform dequantization of the input values and scalings of their reconstruction kernels, when performing inverse discrete cosine transform. The memory 20 is also intended to represent a broad category of memory devices which are well known in the art and will not be described further.

Figure 3:
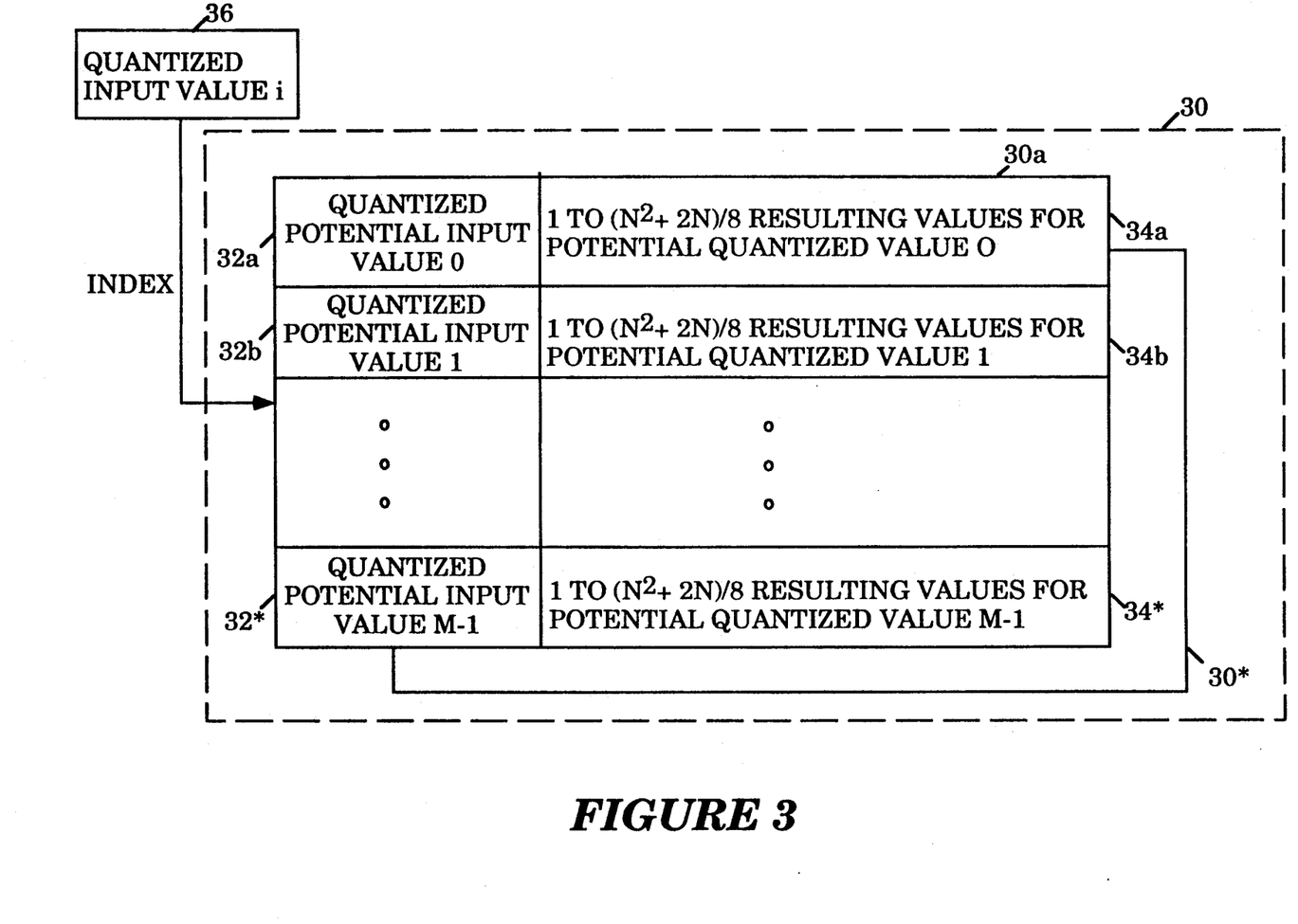
FIG. 3 shows a logical view of the look-up tables of the present invention.

Referring now to FIG. 3, a block diagram illustrating the lookup tables of the present invention for the CPU to perform dequantization of the input values and scaling of their reconstruction kernels is shown. Shown is a collection of lookup tables 30. Each lookup table 30a, . . . , or 30* corresponds to a particular position of the input vector. For an $8 \times 8$ inverse discrete cosine transform, there are sixty-four lookup tables, one for each position of the $8 \times 8$ input vector.

Each lookup table e.g. 30 comprises a plurality of potential input values e.g. 32a-32* and the kernel values e.g. 34a-34* for their corresponding scaled reconstruction kernels. The content of the lookup tables 30 are not refreshed from one IDCT to another, thus making the previously computed and stored potential input values, e.g. 32a-32*, and their corresponding kernel values, e.g. 34a-34*, available for reuse by subsequent IDCTs. Since inverse transforming an image typically requires thousands of transformations, many many identical dequantizations and scalings for a series of IDCTs are thereby eliminated, and the overall IDCT efficiency of the digital image processing system is improved.

In its presently preferred form, the lookup tables 30 are highly optimized, exploiting the symmetry characteristics of the scaled reconstruction kernels, the inherent properties of quantization, and the statistical attributes of the quantized input values. As a result of the optimizations, the amount of computations, the retrieval time, and the overall IDCT efficiency of the digital image processing system is further improved.

First of all, the lookup tables 30 are optimized to exploit the fact that although each scaled reconstruction kernel for an $N \times N$ IDCT is composed of $N^2$ kernel values, at most $(N^2+2N)/8$ of these kernel values are unique, if the sign is ignored. Each lookup table, e.g. 30a, for each potential input value, e.g. 32a, 32b, . . . or 32*, stores at most $(N^2+2N)/8$ unique kernel values, e.g. 34a, 34b, . . . or 34*, of the corresponding scaled reconstruction kernel, instead of all $N^2$ kernel values. Thus, less kernel values have to be computed and maintained in the lookup tables 30. As a result, the total amount of computations and retrieval time required to inverse transform an image is reduced and the overall IDCT efficiency of the digital image processing system is further improved.

For example, for $8 \times 8$ IDCTs, each lookup table stores at most 10 unique kernel values for each potential input value. The number of unique kernel values stored for each potential input value actually ranges from 1 to 10, with an average of 6. This is demonstrated by the following exemplary $8 \times 8$ reconstruction kernels of $8 \times 8$ IDCTs (the number of unique kernel values before and after scaling are the same):

$$k(0,1) = \begin{bmatrix} C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \\ C_{01} & C_{03} & C_{05} & C_{07} & -C_{07} & -C_{05} & -C_{03} & -C_{01} \end{bmatrix}$$

and $$k(1,1) = \begin{bmatrix} C_{11} & C_{13} & C_{15} & C_{17} & -C_{17} & -C_{15} & -C_{13} & -C_{11} \\ C_{13} & C_{33} & C_{35} & C_{37} & -C_{37} & -C_{35} & -C_{33} & -C_{13} \\ C_{15} & C_{35} & C_{55} & C_{57} & -C_{57} & -C_{55} & -C_{53} & -C_{15} \\ C_{17} & C_{37} & C_{57} & C_{77} & -C_{77} & -C_{57} & -C_{37} & -C_{17} \\ -C_{17} & -C_{37} & -C_{57} & -C_{77} & C_{77} & C_{57} & C_{37} & C_{17} \\ -C_{15} & -C_{35} & -C_{55} & -C_{57} & C_{57} & C_{55} & C_{35} & C_{15} \\ -C_{13} & -C_{33} & -C_{35} & -C_{37} & C_{37} & C_{35} & C_{33} & C_{13} \\ -C_{11} & -C_{13} & -C_{15} & -C_{17} & C_{17} & C_{15} & C_{13} & C_{11} \end{bmatrix}$$

and $$k(4,4) = \begin{bmatrix} C_{44} & -C_{44} & -C_{44} & C_{44} & C_{44} & -C_{44} & -C_{44} & C_{44} \\ -C_{44} & C_{44} & C_{44} & -C_{44} & -C_{44} & C_{44} & C_{44} & -C_{44} \\ -C_{44} & C_{44} & C_{44} & -C_{44} & -C_{44} & C_{44} & C_{44} & -C_{44} \\ C_{44} & -C_{44} & -C_{44} & C_{44} & C_{44} & -C_{44} & -C_{4} & C_{44} \\ C_{44} & -C_{44} & -C_{44} & C_{44} & C_{44} & -C_{44} & -C_{44} & C_{44} \\ -C_{44} & C_{44} & C_{44} & -C_{44} & -C_{44} & C_{44} & C_{44} & -C_{44} \\ -C_{44} & C_{44} & C_{44} & -C_{44} & -C_{44} & C_{44} & C_{44} & -C_{44} \\ C_{44} & -C_{44} & -C_{44} & C_{44} & C_{44} & -C_{44} & -C_{44} & C_{44} \end{bmatrix}$$

where:

$$C_{xy} = f(x)f(y)\cos\left(\frac{x\pi}{16}\right)\cos\left(\frac{y\pi}{16}\right)$$

As illustrated above, only 4 unique kernel values are necessary to construct the scaled $k(0,1)$ kernel, 10 are required to construct the scaled $k(1,1)$ kernel, and only 1 is required to construct the scaled $k(4,4)$ kernel. The following table depicts the number of unique kernel values required to construct each 8×8 scaled reconstruction kernel.

| v/u | 0 | 1 | 2 | 3 | 4 | 5 | 6 | 7 |
|---|---|---|---|---|---|---|---|---|
| 0 | 1 | 4 | 2 | 4 | 1 | 4 | 2 | 4 |
| 1 | 4 | 10 | 8 | 10 | 4 | 10 | 8 | 10 |
| 2 | 2 | 8 | 3 | 8 | 2 | 8 | 3 | 8 |
| 3 | 4 | 10 | 8 | 10 | 4 | 10 | 8 | 10 |
| 4 | 1 | 4 | 2 | 4 | 1 | 4 | 2 | 4 |
| 5 | 4 | 10 | 8 | 10 | 4 | 10 | 8 | 10 |
| 6 | 2 | 8 | 3 | 8 | 2 | 8 | 3 | 8 |
| 7 | 4 | 10 | 8 | 10 | 4 | 10 | 8 | 10 |

Thus, all 8×8 scaled reconstruction kernels can be constructed with just 384 unique kernel values instead of all 4096 kernel values as implied by the matrix equation.

Secondly, the lookup tables 30 are optimized to exploit the fact that there are less quantized values than dequantized values. Each lookup table, e.g. 30a, stores the at most $(N^2+2N)/8$ unique kernel values, e.g. 34a–34*, form quantized potential input values, e.g. 32a–32*, where $\log_2(m)$ is an integer, instead of storing unique kernel values for the more numerous dequantized potential input values. Thus, there are less of the at most $(N^2+2N)/8$ unique kernel values, e.g. 34a–34*, to be computed and maintained in the lookup tables 30. As a result, the total amount of computations required to inverse transform an image is further reduced and the overall IDCT efficiency of the digital image processing system is further improved.

Thirdly, the lookup tables 30 are optimized to exploit the fact that the quantized potential input values can be described statistically by the Gaussian distribution. Each lookup table, e.g. 30a stores the at most $(N^2+2N)/8$ unique kernel values, e.g. 34a–34*, for only a subset of the quantized potential input values, e.g. 32a–32*, at any particular point in time. Quantized potential input values, e.g. 32a–32*, with the same $\log_2(m)$ least significant bits and their corresponding at most $(N^2+2N)/8$ unique kernel values, e.g. 34a–34*, share the same table locations. In its presently preferred form, $\log_2(m)$ equals 7. Thus, the most probable quantized potential input values, 1, −1, 2, and −2 and their corresponding at most $(N^2+2N)/8$ unique kernel values do not map to the same table locations in each lookup table, e.g. 30a. Therefore, the at most $(N^2+2N)/8$ unique kernel values computed and stored are likely to remain in the lookup tables 30 for reuse by subsequent IDCTs. Similarly, less of the at most $(N^2+2N)/8$ unique kernel values, e.g. 34a–34*, have to be computed and maintained in the lookup tables 30. As a result, the total amount of memory storage required to invert an image is further reduced and the overall IDCT efficiency of the digital image processing system is further improved.

Fourthly, the unique kernel values stored in the lookup tables 30 are not pre-calculated. Each set of at most $(N^2+2N)/8$ unique kernel values, e.g. 34a, ..., or 34*, is computed and stored only when a selected quantized transform domain coefficient is not stored as a potential input value in the indexed table location of the lookup table corresponding to its position in the input vector. The selected quantized transform domain coefficient is dequantized at this time. At the same time, the selected quantized transform domain coefficient is stored into the indexed table location of the corresponding lookup table as the potential quantized input value for subsequent IDCTs. Thus, computation of the unique kernel values, e.g. 34a, ..., or 34*, are made only if they are needed at least once for the inverse transform of the image. Therefore, there are no wasted calculations. As a result, the overall IDCT efficiency of the digital image processing system is further improved.

Figure 4:
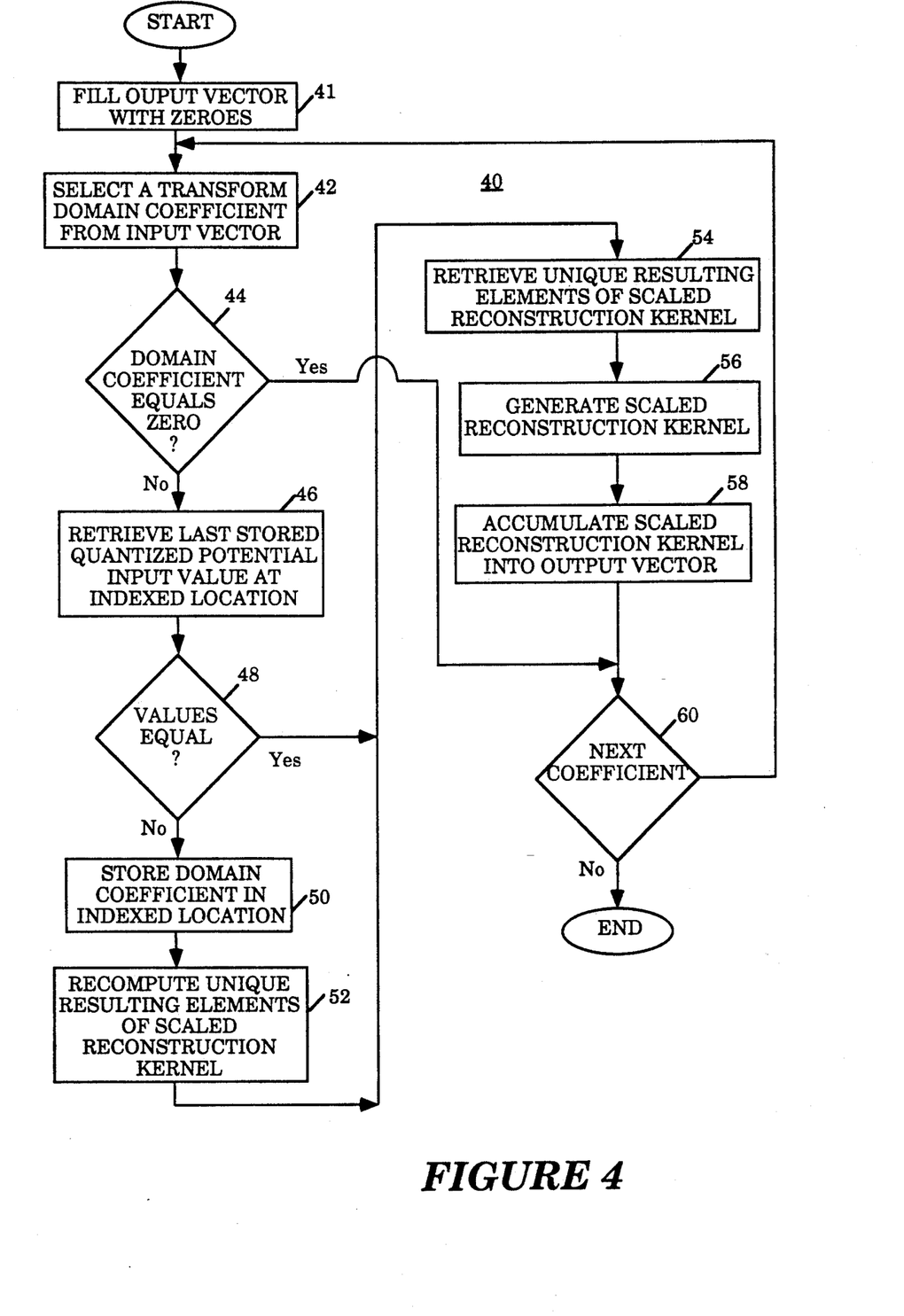
FIG. 4 is a flow chart illustrating the method of the present invention.

Referring now to FIG. 4, a block diagram illustrating the method of the present invention for fast implementation of inverse discrete cosine transform on a digital image processing system is shown. Initially, the CPU fills the output vector in memory with zeroes, block 41. Next a quantized transform domain coefficient is selected from the input vector, block 42. If the selected domain coefficient is non-zero, the last stored quantized potential input value in the corresponding lookup table indexed by the selected transform domain coefficient is retrieved, block 46. If the selected transform domain coefficient and the last stored quantized potential input value are equal, the corresponding unique kernel values of the scaled reconstruction kernel are retrieved from the lookup table, block 54.

If the selected transform domain coefficient and the last stored quantized potential input value are not equal, the selected transform domain coefficient is stored into the indexed table location as the new last stored quantized potential input value, block 50. Additionally, the corresponding unique kernel values of the scaled reconstruction kernel are computed and stored into the lookup table, block 52, before retrieving them, block 54. As discussed earlier, for an N×N case, there are at most $(N^2+2N)/8$ unique kernel values for each scaled reconstruction kernel, if the sign is ignored. Furthermore, the selected transform domain coefficient is dequantized for the calculation at the same time.

Upon retrieving the unique kernel values of the reconstruction kernel, block 54, the scaled reconstruction kernel is generated using the retrieved unique kernel values, block 56. The scaled reconstruction kernel is then accumulated into the output vector, block 58.

Blocks 42–48, 54–58 and optionally 50–52 are repeated for each transform domain coefficient until all transform domain coefficients of an inverse discrete cosine transform have been selected. The process 40 is repeated for each inverse discrete cosine transform until all inverse discrete cosine transforms for an image have been performed.

In an alternate embodiment, the image quality may be traded off for further improvement in the overall IDCT efficiency of the digital image processing system. Under this alternate embodiment, the number of non-zero valued quantized transform domain coefficients whose scaled reconstruction kernels are accumulated into the output vector may be limited. However, the impact on the image quality may be minimized if the quantized transform domain coefficients in the input vector is processed on a priority basis.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital image processing system, a method for efficiently performing inverse discrete cosine transforms (IDCT) on $n \times n$ input vectors comprising quantized input values corresponding to digitized image signals, said method comprising the steps of:

a) selecting a non-zero quantized transform domain coefficient by a processor of an image signal processing subsystem of said digital image processing system from $n^2$ quantized transform domain coefficients of an IDCT input vector stored in a memory of said image signal processing subsystem, said $n^2$ quantized transform domain coefficients being quantized input values corresponding to a plurality of digitized image signals of an image, said digitized image signals being generated by said signal processing subsystem using analog image signals received from an image sampling subsystem of said digital image processing system;
  b) generating a $n \times n$ scaled reconstruction kernel corresponding to said selected quantized transform domain coefficient by said processor of said image signal processing subsystem in said memory of said image signal processing subsystem using a lookup table corresponding to said selected quantized transform domain coefficient's position in said input vector stored in said memory of said image signal processing subsystem, thereby dequantizing said selected quantized transform domain coefficient and scaling its corresponding reconstruction kernel in a combined signal step, said lookup table being one of $n^2$ corresponding lookup tables of said input vector stored in said memory of said image signal processing subsystem, each of said lookup tables comprising a plurality of potential input values and a plurality of unique kernel values for each of said potential input values' corresponding scaled reconstruction kernel; and
  c) accumulating said generated $n \times n$ scaled reconstruction kernel by said processor of said image signal processing subsystem into a $n \times n$ output vector stored in said memory of said image signal processing subsystem, said output vector comprising dequantized output values corresponding to a plurality of inverted digitized image signals provided by said image signal processing subsystem to an image reconstructing subsystem of said digital image processing system for reconstruction of said image.

2. The method as set forth in claim 1, wherein, each of said $n^2$ corresponding lookup tables of said input vector stored in said memory of said image signal processing subsystem is optimized to store at most $(n^2+2n)/8$ unique kernel values, instead of all $n^2$ unique kernel values, for each of said potential input values' corresponding scaled reconstruction kernel, said $n \times n$ scaled reconstruction kernel being generated by said processor of said image signal processing subsystem using said at most $(n^2+2n)/8$ unique kernel values for one of said potential input values' corresponding scaled reconstruction kernel.

3. The method as set forth in claim 1, wherein, each of said $n^2$ corresponding lookup tables of said input vector stored in said memory of said image signal processing subsystem is optimized to store quantized potential input values, instead of dequantized potential input values which are more numerous than said quantized potential input values.

4. The method as set forth in claim 1, wherein, said potential input values and said unique kernel values of their corresponding scaled reconstruction kernels are not prestored in said $n^2$ corresponding lookup tables of said input vector stored in said memory of said image signal processing subsystem, said unique kernel values of each of said potential input values' scaled reconstruction kernel being calculated and stored into one of said $n^2$ corresponding lookup tables of said input vector in conjunction with their corresponding potential value by said processor of said image signal processing subsystem when said selected quantized transform domain coefficient is not stored as a potential input value in an indexed table location of said lookup table corresponding to said selected quantized transform domain coefficient's position in said input vector, said indexed table location being indexed by said selected quantized transform domain coefficient.

5. The method as set forth in claim 1, wherein, each of said $n^2$ corresponding lookup tables of said input vector stored in said memory of said image signal processing subsystem is optimized to store only a subset of all quantized potential input values, only one of all quantized potential input values having the same $\log_2(m)$ least significant bits being stored in any particular point in time.

6. The method as set forth in claim 1, wherein, said steps a) through c) are repeated for all non-zero quantized transform domain coefficients of said input vector by said processor of said digital image signal processing subsystem for each of said IDCTs.

7. The method as set forth in claim 1, wherein, said steps a) through c) are repeated for less than all non-zero quantized transform domain coefficients of said input vector by said processor of said digital image signal processing subsystem for each of said IDCTs.

8. The method as set forth in claim 7, wherein, said steps a) through c) are repeated for less than all non-zero quantized transform domain coefficients of said input vector by said processor of said image signal processing subsystem for each of said IDCTs in a priority basis.

9. The method as set forth in claim 1, wherein, said step b) comprises the steps of:
  b.1) retrieving one of said potential input values from said lookup table corresponding to said selected quantized transform domain coefficient's position in said input vector stored in said memory of said image signal processing subsystem by said processor of said image signal processing subsystem, said retrieved one of said potential input values being indexed by said selected quantized transform domain coefficient; and
  b.2) determining if said selected transform domain coefficient and said retrieved one of said potential input values are equivalent by said processor of said image signal processing subsystem,
  b.3) replacing said retrieved one of said potential input values in said lookup table corresponding to said selected quantized transform domain coefficient's position in said input vector stored in said memory of said image signal processing subsystem with said selected transform domain coefficient by said processor of said image signal processing subsystem if said retrieved one of said potential input values and said selected transform domain coefficient are determined to be not equivalent;
  b.4) computing unique kernel values for said selected transform domain coefficient's scaled reconstruction kernel by said processor of said image signal processing subsystem if said retrieved one of said potential input values and said selected transform domain coefficient are determined to be not equivalent;

b.5) replacing said unique kernel values for said retrieved one of said potential input values' reconstruction kernel in said lookup table corresponding to said selected quantized transform domain coefficient's position in said input vector stored in said memory of said image signal processing subsystem with said newly computed unique kernel values for said selected transform domain coefficient's scaled reconstruction kernel by said processor of said image processing subsystem if said retrieved one of said potential input values and said selected transform domain coefficient are determined to be not equivalent;

b.6) retrieving a selected one of said unique kernel values for said retrieved one of said potential input values' scaled reconstruction kernel and said replacing unique kernel values newly computed for said selected transform domain coefficient's scaled reconstruction kernel from said lookup table corresponding to said selected quantized transform domain coefficient's position in said input vector stored in said memory of said image signal processing subsystem by said processor of said image signal processing subsystem; and b.7) generating said $n \times n$ scaled reconstruction kernel for said selected quantized transform domain coefficient by said processor of said image signal processing subsystem in said memory of said image signal processing subsystem using said retrieved unique kernel values.

10. In a digital image processing system, an apparatus for efficiently performing inverse discrete cosine transforms (IDCT) on $n \times n$ input vectors comprising quantized input values corresponding to digitized image signals, said apparatus comprising:

a) selection means of an image signal processing subsystem of said digital image processing system comprising a processor for selecting a non-zero quantized transform domain coefficient from $n^2$ quantized transform domain coefficients of an IDCT input vector stored in a memory of said image signal processing subsystem, said memory of said image signal processing subsystem being coupled to said processor of said image signal processing subsystem, said $n^2$ quantized transform domain coefficients being quantized input values corresponding to a plurality of digitized image signals of an image, said digitized image signals being generated by said image signal processing subsystem using analog image signals received from an image sampling subsystem of said digital image processing system;

b) generation means of said image signal processing subsystem coupled to said selection means of said image signal processing subsystem comprising said processor for generating a $n \times n$ scaled reconstruction kernel corresponding to said selected quantized transform domain coefficient in said memory of said image signal processing subsystem using a lookup table corresponding to said selected quantized transform domain coefficient's position in said input vector stored in said memory of said image signal processing subsystem, thereby dequantizing said selected quantized transform domain coefficient and scaling its corresponding reconstruction kernel in a combined single step, said lookup table being one of $n^2$ corresponding lookup tables of said input vector stored in said memory of said image signal processing subsystem, each of said lookup tables comprising a plurality of potential input values and a plurality of unique kernel values for each of said potential input values' corresponding scaled reconstruction kernel; and c) accumulation means of said image signal processing subsystem coupled to said generation means of said image signal processing subsystem comprising said processor for accumulating said generated $n \times n$ scaled reconstruction kernel into a $n \times n$ output vector stored in said memory of said image signal processing subsystem, said output vector comprising dequantized output values corresponding to a plurality of inverted digitized image signals provided by said image signal processing subsystem to an image reconstructing subsystem of said digital image processing system for reconstruction of said image.

11. The apparatus as set forth in claim 10, wherein, each of said $n^2$ corresponding lookup tables of said input vector stored in said memory of said image signal processing subsystem is optimized to store at most $(n^2+2n)/8$ unique kernel values, instead of all $n^2$ unique kernel values, for each of said potential input values' corresponding scaled reconstruction kernel, said $n \times n$ scaled reconstruction kernel being generated by said processor of said selection/generation/accumulation means of said image signal processing subsystem using said at most $(n^2+2n)/8$ unique kernel values for one of said potential input values' corresponding scaled reconstruction kernel.

12. The apparatus as set forth in claim 10, wherein, each of said $n^2$ corresponding lookup tables of said input vector stored in said memory of said image signal processing subsystem is optimized to store quantized potential input values, instead of dequantized potential input values which are more numerous than said quantized potential input values.

13. The apparatus as set forth in claim 10, wherein, said potential input values and said unique kernel values of their corresponding scaled reconstruction kernels are not prestored in said $n^2$ corresponding lookup tables of said input vector stored in said memory of said image signal processing subsystem, said unique kernel values of each of said potential input values' scaled reconstruction kernel being calculated and stored into one of said $n^2$ corresponding lookup tables of said input vector in conjunction their corresponding potential value by said processor of said selection/generation/accumulation means of said image signal processing subsystem when said selected quantized transform domain coefficient is not stored as a potential input value in an indexed table location of said loikup table corresponding to said selected quantized transform domain coefficient's position in said input vector, said indexed table location being indexed by said selected quantized transform domain coefficient.

14. The apparatus as set forth in claim 10, wherein, each of said $n^2$ corresponding lookup tables of said input vector stored in said memory of said image signal processing subsystem is optimized to store only a subset of all quantized potential input values, only one of all quantized potential input values having the same $\log_2(m)$ least significant bits being stored in any particular point in time.

15. The apparatus as set forth in claim 10, wherein, said processor of selection/generation/accumulation means of said digital image signal processing subsystem repeats said selection, generation and accumulation for all non-zero quantized transform domain coefficients of said input vector for each of said IDCTs.

16. The apparatus as set forth in claim 10, wherein, said processor of said selection/generation/accumulation means of said digital image signal processing subsystem repeats said selection, generation, and accumulation for less than all non-zero quantized transform domain coefficients of said input vector for each of said IDCTs.

17. The apparatus as set forth in claim 16, wherein said processor of said selection/generation/accumulation means of said digital image signal processing subsystem repeats said selection generation and accumulation for less than all non-zero quantized transform domain coefficients of said input vector for each of said IDCTs in a priority basis.

18. The apparatus as set forth in claim 10, wherein, said generation means of said image signal processing subsystem generates said n×n scaled reconstruction kernel for said selected quantized transform domain coefficient by,
  retrieving one of said potential input values from said lookup table corresponding to said selected quantized transform domain coefficient's position in said input vector stored in said memory of said image signal processing subsystem, said retrieved one of said potential input values being indexed by said selected quantized transform domain coefficient;
  determining if said selected transform domain coefficient and said retrieved one of said potential input values are equivalent;
  replacing said retrieved one of said potential input values in said lookup table corresponding to said selected quantized transform domain coefficient's position in said input vector stored in said memory of said image signal processing subsystem with said selected transform domain coefficient if said retrieved one of said potential input values and said selected transform domain coefficient are determined to be not equivalent;
  computing unique kernel values for said selected transform domain coefficient's scaled reconstruction kernel if said retrieved one of said potential input values and said selected transform domain coefficient are determined to be not equivalent;
  replacing said unique kernel values for said retrieved one of said potential input values' reconstruction kernel in said lookup table corresponding to said selected quantized transform domain coefficient's position in said input vector stored in said memory of said image signal processing subsystem with said newly computed unique kernel values for said selected transform domain coefficient's scaled reconstruction kernel if said retrieved one of said potential input values and said selected transform domain coefficient are determined to be not equivalent;
  retrieving a selected one of said unique kernel values for said retrieved one of said potential input values' scaled reconstruction kernel and said replacing unique kernel values newly computed for said selected transform domain coefficient's scaled reconstruction kernel from said lockup table corresponding to said selected quantized transform domain coefficient's position in said input vector stored in said memory of said image signal processing subsystem; and
  generating said n×n scaled reconstruction kernel for said selected quantized transform domain coefficient in said memory of said image signal processing subsystem using said retrieved unique kernel values.

* * * * *